Patented Mar. 26, 1935

1,995,580

UNITED STATES PATENT OFFICE 1,995,580

MANUFACTURE OF RUTILE

Joachim Rockstroh, Cologne-Deutz, Friedrich Raspe, Leverkusen-I. G. Werk, and Heinrich Kircher, Leverkusen-Schlebusch, Germany, assignors to I. G. Farbenindustrie Aktiengesellschaft, Frankfort-on-the-Main, Germany No Drawing. Application April 7, 1934, Serial No. 719,584. In Germany October 1, 1931

7 Claims. (Cl. 23—1)

This invention relates to the manufacture of rutile from anatase. It consists in adding to the anatase a small amount of another substance which has the crystal structure of rutile, but being chemically different therefrom, and heating.

It is known that polymorphy can be observed on a number of elements and compounds. With the difference in the crystal structure also numerous other properties related therewith, such as cleavability, optic, thermic and electric conducting power etc. may vary. In the technic it is of importance in such cases to manufacture from a substance only a definite modification if this modification shows certain technically valuable properties to a decided extent and is superior to other modifications of the same substance.

As is known the transformation of polymorphous substances is effected under certain conditions of temperature and pressure and sometimes depends on the time during which temperature and pressure influence the compounds.

We have found that the transformation of anatase into rutile may be considerably favored by performing the transformation in the presence of such substances which themselves possess the crystal structure of the rutile, but being chemically different therefrom, by adding these substances to the anatase before or during the transformation. The effect of these additions is extended to the temperature at which transformation may take place and also to the time, such, that either the transformation of the anatase into rutile at the same temperature at which otherwise the anatase is transformed, is performed in a much shorter time or, the transformation is performed during the usually applied time at a lower temperature wholly or partially, but then in a much better yield than without additions. By the saving of time or the saving of energy necessary for heating a great technical advance is attained.

A further advantage of the present invention is that working at a lower temperature in the transformation process becomes possible; thereby damages, occurring when anatase is treated without any addition and at a higher temperature required in such a case, can be avoided. The higher temperatures required would compensate the advantages brought about by the transformation, for example, those of color-technical nature, by impairing other qualities.

The favorable effect of the additions can already be observed when using small quantities thereof; this must be considered a further technical advance because undesired costs in the technical process are avoided.

The process may be carried out in such a manner that the additions favorably influencing the transformation of anatase into rutile may be applied before calcining in a wet or dry state to the anatase. The additions may also be made during the calcining process; or, calcining may be effected in two stages, whereby the substance is added after the first stage. Further, the substance favorably influencing the transformation may be formed in the mixture itself either from the single compounds already present in the mixture or on account of a change they undergo in the transformation process.

The invention is further illustrated by the following examples without being restricted thereto:—

*Example 1.*—Pure dried titanic acid hydrate which according to X-ray photography tests has proved to consist of anatase crystals is intimately mixed with 4 parts by weight of manganous sulfate or the corresponding quantity of another manganese compound likewise transforming into manganous oxide on heating, calculated upon 100 parts by weight each of $TiO_2$, and the mixture is heated to 800° C., for one hour. The product thus obtained completely consists of rutile crystals, whereas the pure titanic acid hydrate heated without any additions possesses the unchanged anatase structure, and heated to 900° C. for one hour is only transformed to 60% into rutile.

*Example 2.*—100 grams of pure $TiO_2$, in the form of dried titanic acid hydrate are intimately mixed with 1.8 grams of $SnO_2$ (chemically pure) and calcined to 850° C.; another portion of the same mixture is heated to 900° C. for one hour, and a third and fourth portion of $TiO_2$ is calcined without any addition at 850° C. and 900° C. respectively. The starting material consists of anatase crystals. The $TiO_2$ calcined without additions consists after calcining at 850° C. only of anatase crystals, whereas the $TiO_2$ heated at 900° C. consists of to 60% of rutile crystals and to 40% of anatase crystals. The $TiO_2$ heated with the addition is however transformed to 20% at 850° C., and completely transformed into rutile crystals at 900° C. Instead of $SnO_2$ also another tin salt, such as tin chloride, may be applied which on heating, is transformed into $SnO_2$.

This is a continuation in part of our co-pending application Serial No. 634,988, filed September 26, 1932.

We claim:—

1. Process of preparing rutile from anatase, consisting in performing the transformation in the presence of substances crystallizing in the rutile lattice, but being chemically different therefrom.

2. Process of preparing rutile from anatase, consisting in heating anatase in admixture with a small amount of a compound crystallizing in the rutile lattice, but being chemically different therefrom.

3. Process of preparing rutile from anatase which comprises heating anatase at a temperature of about 800 to 850° C. in admixture with a small amount of a compound crystallizing in the rutile lattice but being chemically different therefrom.

4. Process of preparing rutile from anatase, consisting in heating anatase in admixture with a small amount of manganous oxide.

5. The process as defined in claim 4 wherein the heating is effected at a temperature of about 800° C.

6. Process of preparing rutile from anatase, consisting in heating anatase in admixture with a small amount of tin oxide.

7. The process as defined in claim 6 wherein the heating is effected at a temperature of about 850° C.

JOACHIM ROCKSTROH.
FRIEDRICH RASPE.
HEINRICH KIRCHER.